United States Patent [19]

Sech

[11] 4,139,418
[45] Feb. 13, 1979

[54] METHOD AND APPARATUS FOR THE DISTILLATION PURIFICATION OF ORGANIC HEAT TRANSFER FLUIDS

[76] Inventor: Charles E. Sech, 45 Creekwood, Glendale, Ohio 45246

[21] Appl. No.: 771,984

[22] Filed: Feb. 25, 1977

Related U.S. Application Data

[63] Continuation-in-part of Ser. No. 570,082, Apr. 21, 1975, abandoned.

[51] Int. Cl.² .............................................. B01D 3/42
[52] U.S. Cl. ..................................... 202/181; 202/234
[58] Field of Search ..................... 202/181, 206, 234; 426/488; 219/271, 275; 417/208, 209

[56] References Cited

U.S. PATENT DOCUMENTS

| Re. 28,524 | 8/1975 | Brebant | 202/175 |
| 2,407,616 | 9/1946 | Phelps et al. | 426/488 |
| 2,556,186 | 6/1951 | Hegenbarth | 159/27 |
| 3,575,815 | 4/1971 | Seih | 137/485 |
| 3,697,384 | 10/1972 | Walker | 202/160 |
| 3,717,748 | 2/1973 | Imler | 417/209 |

FOREIGN PATENT DOCUMENTS 768138  2/1957  United Kingdom ..................... 202/181

Primary Examiner—Hiram H. Bernstein
Attorney, Agent, or Firm—Sidney W. Russell

[57] ABSTRACT

An electrically heated still or purifier for the distillation purification of heat transfer fluids such as diphenyl, diphenyl ether and mixtures thereof which are contaminated with high boiling thermal decomposition products. The design incorporates an internal draft tube to induce natural circulation of the boiling liquid and thereby enhance heat transfer coefficients. The purifier is especially adapted for operation with Dowtherm A at temperatures of 700°–750° F. for removal of thermal decomposition products and corresponding superatmospheric pressures for Dowtherm A containing low boiling contaminants or other low boiling organic fluids without danger of overheating the heat transfer fluid.

8 Claims, 5 Drawing Figures

METHOD AND APPARATUS FOR THE DISTILLATION PURIFICATION OF ORGANIC HEAT TRANSFER FLUIDS

This application is a continuation-in-part of my copending patent application Ser. No. 570,082, filed Apr. 21, 1975, and now abandoned all the teachings of which are incorporated herein by reference.

This invention is directed to a self-contained continuous electrically heated purifier for organic heat transfer fluids which vaporize below their decomposition temperatures. The invention is related to and is an improvement upon the purifier described in my U.S. Pat. No. 3,575,815.

BACKGROUND OF THE INVENTION AND PRIOR ART

Polyphenyl compounds, especially diphenyl, diphenyl ether and halogenated derivatives thereof are widely employed as heat transfer fluids. Exemplary of such materials are diphenyl ether or a eutectic mixture of diphenyl ether and diphenyl marketed commercially under the trademarks "Dowtherm" and "Dowtherm A." Polyphenyl compositions suitable as heating media generally exhibit a low vapor pressure, a nearly constant boiling point, excellent heat transfer characteristics and good thermal stability. They find application wherever close process temperature control is a prime requisite.

The heat transfer fluid is typically utilized in a closed recirculating cycle between a central heat source, on the one hand, and one or more heat sinks or process users on the other. The heat sink may be, for example, the reboiler of a fractionating column, a jacketed autoclave, a steam generator and the like. The heat transfer fluid can be used in either the vapor or liquid state. Notwithstanding good thermal stability, however, polyphenyls are nevertheless prone to undergo thermal degradation over a long period of use to form high boiling thermal decomposition products. If allowed to accumulate in the system, the high boiling contaminants would eventually render the entire polyphenyl inventory unfit for further use. Therefore, it is desirable and customary in the art to provide a means for the continuous or semi-continuous purification of the polyphenyl heat transfer fluids. One such system is described in U.S. Pat. No. 3,113,090, relating to the continuous on-line distillation purification of circulating polyphenyl wherein a slip stream of polyphenyls is flashed to a still which is reboiled by a separate stream of polyphenyls.

In carrying out the distillation purification of Dowtherm A or other polyphenyl heat transfer fluid, the impure polyphenyl comprises the feed to the still, purified heat transfer fluid is taken overhead and the bottoms comprises high boiling decomposition products. The high boiling residues are essentially non-volatile. The residue is rejected either continuously or intermittently, preferably when the percentage of high boilers, according to distillation, reaches 50 percent or more. In practice, it has been found that these residues are still flowable when the residue concentration, according to ASTM distillations, is as high as 70 percent.

When the still or purifier is reboiled by condensing vapors of Dowtherm A taken from the vaporizer of the central heat transfer system, as in U.S. Pat. No. 3,575,815, the vapor pressure in the purifier is necessarily less than system pressure by reason of the temperature difference across the reboiler heating coil. If it is desired to return the purified Dowtherm A to the vaporizer in a continuous manner, a vapor compressor or a condenser and condensate return pump must be provided, which equipment adds to the cost and complexity of the unit. In addition, if the temperature level of the heat transfer system is relatively low, i.e., below 600°-625° F., the purifier must be run under vacuum, again increasing capital and operating costs.

In order to allow the operating pressure of the purifier to be established independently of heat transfer system pressure, it is necessary to provide an independent source of reboiler heat for the purifier. One such source is electric resistance heating. Electrically heated vaporizers for Dowtherm A heretofore employed have generally been limited to operation at bulk liquid temperatures not exceeding 600°-650° F. Attempts to extend that temperature upwardly have proven unsuccessful because extreme heating of the liquid film adjacent to the electric heating element leads to rapid thermal degradation of the heat transfer fluid.

OBJECTS OF THE INVENTION

One object of the invention is to provide an electrically heated purifier for Dowtherm A or other organic heat transfer fluid capable of operation at superatmospheric pressure which is independent of the central heat transfer system pressure.

Another object of this invention is to provide an electrically heated purifier capable of operating at bulk liquid temperatures as high as 700°-750° F. without danger of decomposing the heat transfer fluid.

A further object of this invention is to provide methods and apparatus for the continuous on-line or closed-loop distillation purification of polyphenyl heat transfer fluids without the use of vapor compressors, condensate pumps or vacuum operation.

These and other objects and advantages of the invention will be apparent from the detailed description to follow.

SUMMARY OF THE INVENTION

The purifier of this invention broadly comprises a closed vessel, a feed inlet conduit connecting therewith at a locus intermediate the top and bottom of the vessel, a vapor outlet in the upper portion of the vessel, a bottoms or residue discharge conduit connecting with the lower portion of the vessel, vertically extended electrical resistance heating means, and a vertical draft tube disposed within the vessel and extending from near the bottom thereof to an elevation below the vapor outlet, the draft tube thus defining a narrow annular space between the tube and the vertical sidewall of the vessel. In one embodiment, the electric resistance heater is defined by a number of longitudinally spaced band-like heater elements wrapped around the exterior surface of the lower portion of the vessel. In another embodiment, the electric resistance heater is composed of a number of bayonet-hairpin type heater elements centrally clustered within the draft tube. The height of the draft tube is substantially coextensive with the height of the heating zone, and the liquid level within the purifier is controlled such that the draft tube is submerged in liquid at all times.

In a typical installation in conjunction with a high pressure heat transfer system, liquid from a vaporizer containing high boiling residue constituents flows from a location near the bottom of the vaporizer on a natural circulation vaporizer, or from the circulating pump or heater discharge in the case of a forced circulation heater or vaporizer, into the purifier. Vapor from the purifier flows through a vapor line back to the vapor space within the vaporizer. The differential pressure or driving force to cause the vapor to flow from the purifier back to the vaporizer is provided by the electric resistance heating elements which raise the temperature in the purifier to a point at which the vapor pressure in the purifier exceeds the vapor pressure in the vaporizer. In most cases, the differential pressure required to force the vapor from the purifier back to the vaporizer will be approximately an inch or less of liquid. The purifier and connecting lines are all insulated thermally to minimize heat losses and, therefore, substantially all of the electrical energy introduced into the purifier is returned to the vaporizer, thereby assuring minimum consumption of utilities. The only heat losses involved are those through the insulation of the purifier system and those which by necessity flow from the purifier with concentrated residue when or as it is dumped from the purifier.

In its process or method aspects, the invention is directed to an improvement in a heat transfer process wherein an organic heat transfer fluid, subject to thermal degradation to form high boiling contaminants, is circulated in a closed system including a vaporizer and a heat sink, said vaporizer containing an inventory of said heat transfer fluid in the liquid phase, said improvement being the method of purifying said heat transfer fluid by withdrawing a portion of liquid phase heat transfer fluid from said vaporizer, reboiling said portion by electric resistance heating to form a residue fraction relatively rich in said contaminants and a vapor fraction substantially free of said contaminants, condensing said vapor fraction in a condenser maintained at an elevation above said inventory, and returning the resultant condensate by gravity flow to said vaporizer, said elevation being sufficient to provide the hydrostatic head required to return the condensate from said condenser to the vaporizer.

A further embodiment of the invention concerns an improvement in a heat transfer process wherein an organic heat transfer fluid, subject to thermal degradation to form high boiling contaminants, is circulated in the liquid phase by forced convection from a flash zone through a heater and is therein partially vaporized and the resulting vapor-liquid mixture is returned to said flash zone, said improvement being the method of purifying said heat transfer fluid by withdrawing a portion of heat transfer fluid from said process, reboiling said portion by electric resistance heating to form a residue fraction relatively rich in said contaminants and a vapor fraction substantially free of said contaminants, and returning said vapor fraction without substantial condensation to said flash zone.

DETAILED DESCRIPTION OF THE INVENTION

The invention is readily understood by reference to the accompanying drawings in which.

Figure 1:
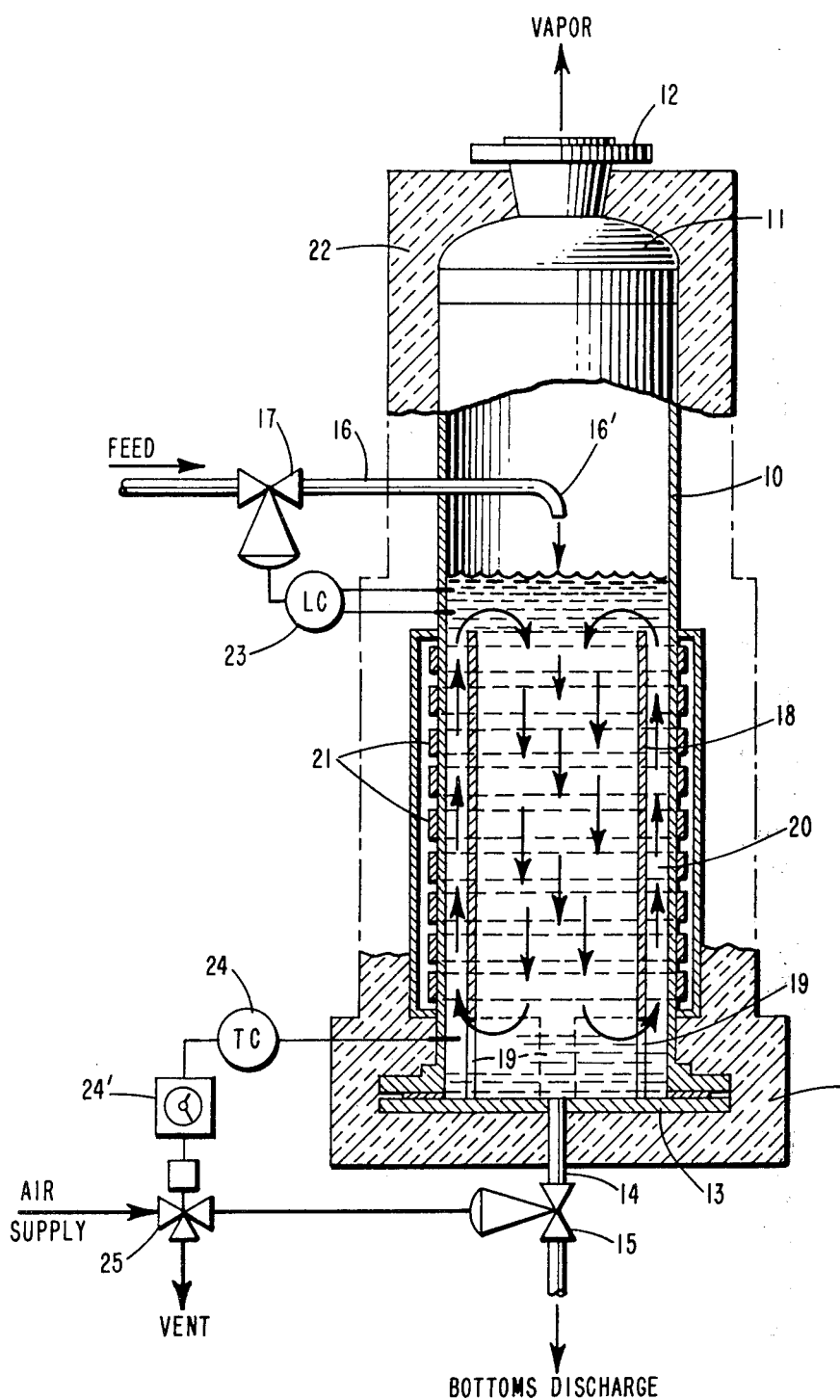
FIG. 1 is a vertical sectional view of one embodiment of the purifier in which the electrical resistance heating means is composed of resistance bands wrapped around the shell of the purifier.

With reference now to FIG. 1, the purifier is comprised of a vertically elongated vessel defined by a cylindrical-form shell 10, an upper pipe cap 11 and a lower flange closure member 13. A flanged vapor outlet nozzle 12 is connected to cap 11. The bottoms or residue discharge from the purifier is removed through conduit 14 and control valve 15. Impure heat transfer liquid is fed to the purifier through control valve 17 and feed inlet conduit 16 which extends into the central portion of shell 10 and terminates in a downwardly directed elbow 16'. An open-ended circular-form vertical draft tube 18 is concentrically disposed within shell 10 and is supported at its lower end by spaced web members 19 secured to flange 13. The draft tube 18 together with shell 10 define a vertically elongated annular space 20, the width of which is relatively critical, as will be demonstrated by a computer analysis hereinafter presented. Generally, the width of annular space 20 will be in the range of from about 0.1 to about 1.5 inches and preferably in the range of from about 0.125 to about 0.375 inches. The height of the draft tube should be at least 0.5, and preferably about 0.8 to about 1.2 pipe diameters based on the diameter of shell 10. Heating elements 21 are a number of longitudinally spaced, band-like resistance elements extending around and in contact with the exterior surface of the lower portion of shell 10. These heating elements may be connected to any suitable source of power such as 110 volts single phase, 220 volts three phase, or 440 volts three phase. Substantially, the entire vessel is enclosed with a layer of insulation 22. The liquid level in the vessel is controlled by level controller 23 actuating valve 17. Such level controller may be a float type instrument, a differential pressure sensor or any other suitable level detecting instrument well-known to those skilled in the instrumentation art. The rate of bottoms discharge is regulated by temperature controller 24, responsive to the temperature of the liquid residue maintained within the purifier, and which actuates the three-way valve 25 to open and close valve 15 responsive to said temperature. Alternatively, valve 25 may be actuated by a cycle timer 24'. When the purifier is placed in operation, the heat input vaporizes the liquid in annular space 20 causing a natural circulation resulting from the density difference between the liquid-vapor mixture in the annulus and the liquid within draft tube 18, the direction of said circulation being as shown in FIG. 1. Such circulation in turn substantially increases the heat transfer film coefficients and reduces the wall temperature, thus avoiding overheating and degradation of the heat transfer fluid.

Figure 2:
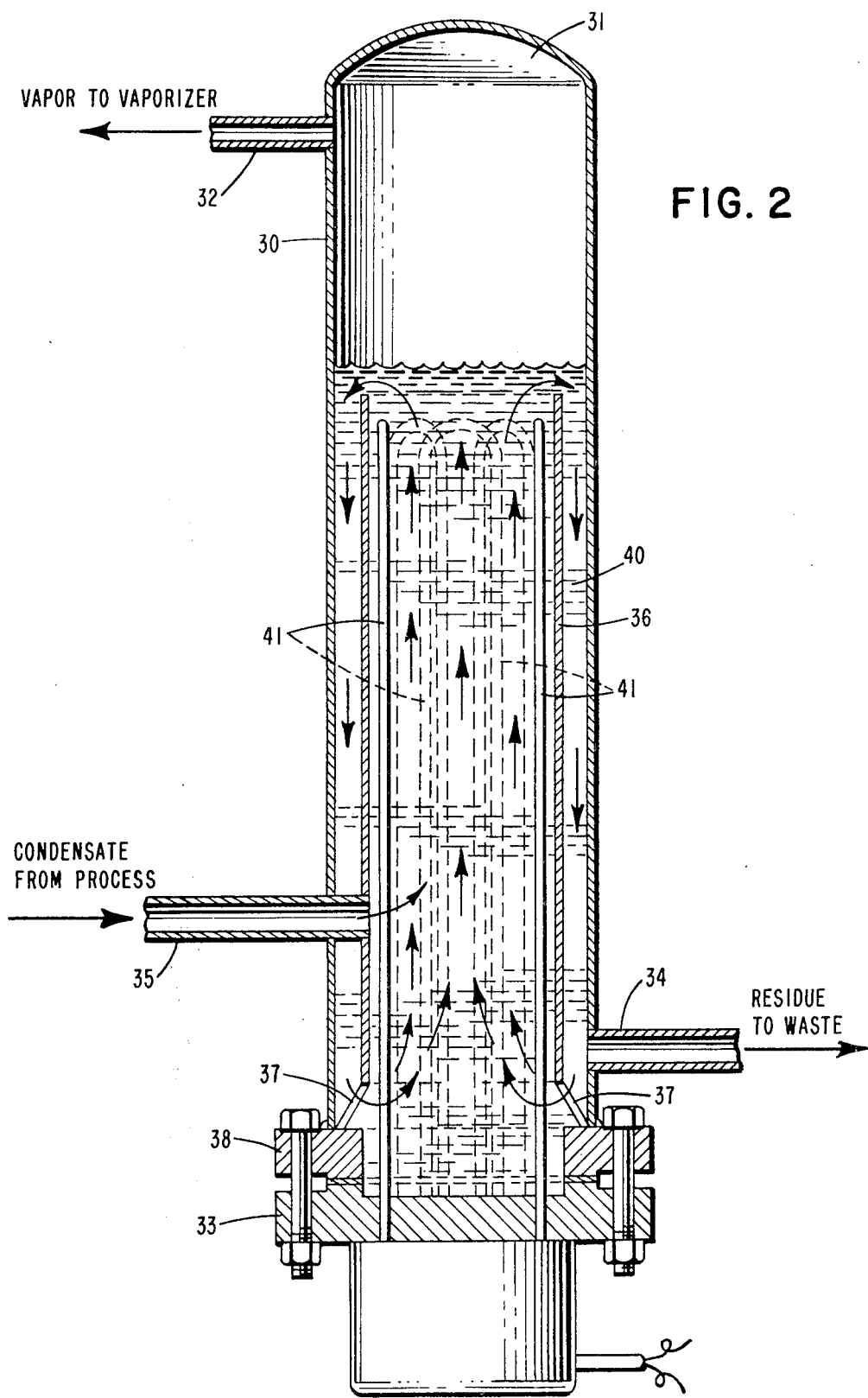
FIG. 2 is a vertical sectional view of another embodiment of the purifier in which the electrical resistance heating element is a nest or cluster of bayonet-hairpin type heater elements extending into the purifier.

With reference to FIG. 2, the purifier comprises a cylindrical-form shell 30, a top closure member 31 and a removable bottom flange member 33. Purified vapor is taken overhead through vapor outlet 32 in the upper portion of the vessel, and residue to waste is removed via conduit 34 connecting with the lower portion of the vessel. Impure heat transfer fluid is charged to the purifier through feed inlet conduit 35. An open-ended vertically elongated draft tube 36 is centrally positioned within shell 30 and is supported at its lower end by spaced struts or webs 37 attached to upper mating flange 38. In this embodiment, the electrical resistance heating means is composed of a nest or cluster of bayonet-hairpin type heater elements 41 centrally disposed within said draft tube and supported by and connecting with flange 33. The draft tube 36 together with shell 30 define an outer annular space 40, the width of which is again relatively critical as in the case of the embodiment of FIG. 1. The feed inlet conduit 35 extends through annular space 40 and discharges into the interior of draft tube 36. The purifier of FIG. 2 may be provided with automatic controls in a manner similar to the embodiment in FIG. 1, not shown in this drawing. The purifier is further provided with suitable insulation substantially encompassing the closed vessel which again is not shown for the purpose of simplicity. The operation of this embodiment is essentially the same as the embodiment of FIG. 1 except that the direction of the induced circulation flow is reversed.

The following example is given to indicate the criticality of the instant 0.1 to 1.5 inch annular draft tube. The numbers were derived via a computer printout for simulation in a hereinafter described vessel. The examples are not given for the purpose of unduly limiting the claims and are but a mere personification of the delineations and parameters of the same.

EXAMPLE I

In this example various draft tube sizes of from no draft tube to one of 2.0 inches was tested to demonstrate the criticality of the 0.1 to 1.5 inch claimed range. All experiments herein (1–7) of this Example were performed by computer simulation based on two-phase correlations by Lockhart and Martenelli (the slip model for the fractional pressure gradient of the adiabatic two-phase annular flow). The Heat Transfer Coefficients were calculated using a correlation by Chen. It must be noted that a higher heat transfer rate is important to prevent the Dowtherm fluid from being overheated. In this manner Dowtherm A may be heated to an adequate temperature for purification purposes without exceeding 800° F. at which rapid degradation is initiated.

All experiments were performed with an annular draft tube height of 9 inches; the fluid was Dowtherm A, a eutectic mixture of diphenyl ether and diphenyl marketed by the Dow Chemical Corporation under the trademark "DOWTHERM A"; the diameter of the vessel is about 14 inches with a heat input of 15 KW. The initial liquid temperature was set at 500° F. which corresponds to the boiling point of Dowtherm A at atmospheric pressure. Table I demonstrates the results attained by the respective annular openings.

TABLE I

| Case | Annular Space | Wall Temp and ° F. | Heat Transfer Coef. Btu/hr. ft.$^{2}$° F. |
|---|---|---|---|
| 1 | None | 548° F. | 403 |
| 2 | 0.10" × 9" high | 522° F. | 873 |
| 3 | .25" × 9" high | 525° F. | 775 |
| 4 | .375" × 9" high | 527° F. | 730 |
| 5 | .75" × 9" high | 532° F. | 600 |
| 6 | 1.5" × 9" high | 544° F. | 443 |
| 7 | 2" × 9" high | 549° F. | 396 |

Analysis of the aforementioned data indicates substantially the same results were attained utilizing no draft tube and one of two inches. The wall temperature unexpectedly dropped 26° F. by the use of a 0.1 inch annular draft tube. Thereafter the wall temperature gradually rose with an increase in the annular draft tube opening which demonstrates that use of the draft tube allows more efficient circulation through the vessel at lower wall temperatures for purification purposes. The wall temperature began rising rapidly with an increase from 0.0375 inches to 0.75 and 1.5 inches. Hence, as aforementioned, the preferred range is 0.125 to 0.375 but the draft tube is operable and the results derived thereby unexpected from 0.1 to 1.5 inches.

Likewise, the heat transfer coefficient increases from 403 Btu/hr. ft.$^{2}$ ° F. with no draft tube to 873 Btu/hr. ft.$^{2}$ ° F. with the 0.1 inch annular opening (an increase of 470 Btu/hr. ft.$^{2}$ ° F.). This is substantially the comparative increase obtained in comparison with a two-inch annular opening. The data demonstrates the decrease in Heat Transfer Coefficient as the annular opening is progressively increased.

In conclusion, experiments 1–7 of this Example demonstrate the viability of the annular draft tube of 0.1 to 1.5 inches, by comparison of corresponding data obtained within the range (0.1; 0.25; 0.375; 0.75; and 1.5) to that derived extrinsic to the lower and uppermost claimed range (no draft tube; and two-inch draft tube).

Figure 3:
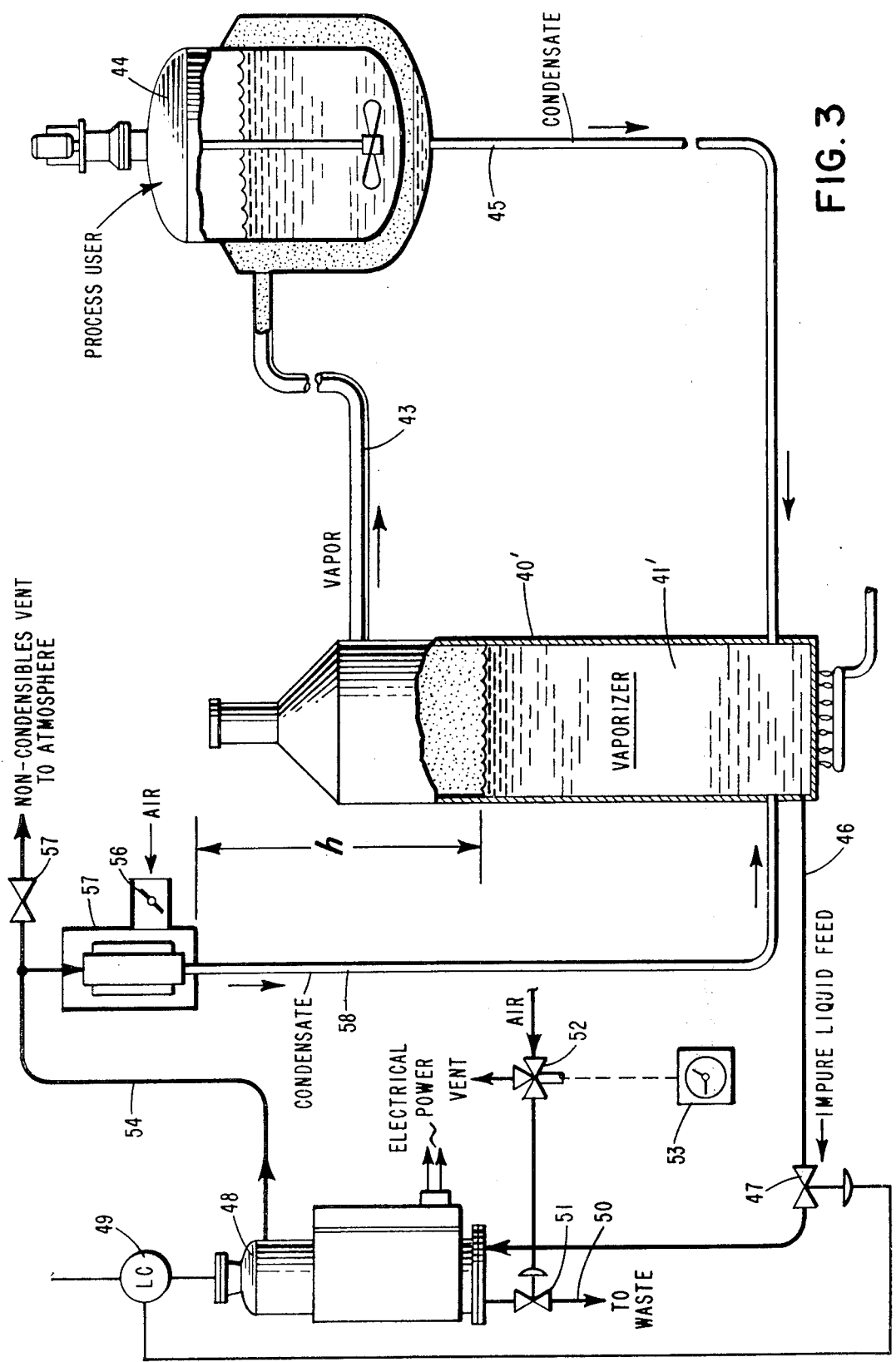
FIG. 3 is a diagrammatic view of a natural convection vapor phase heat transfer system utilizing the purifier of the present invention.

FIG. 3 illustrates a natural convection vapor phase heat transfer system in combination with a continuous purifier. Dowtherm A is vaporized in a vertical fire tube vaporizer 40' and the resulting vapor is passed via line 43 to process user 44 (which typically includes a plurality of heat sinks). The vapor is condensed upon giving up its latent heat of vaporization and the condensate is returned by gravity flow through line 45 to vaporizer 40'. The heat transfer system including the vaporizer and process users is typically operated at a temperature of about 600° to about 770° F. and a corresponding saturation pressure of about 30 to about 160 psig. A slip stream of impure Dowtherm A is passed by gravity flow through line 46 and valve 47 and is charged to purifier 48. Purifier 48 may embody the design of either FIG. 1 or FIG. 2. The liquid level in the purifier is controlled by level controller 49 which acts upon valve 47 to vary the feed rate responsive to said liquid level. Residue containing high boiling contaminants is rejected to waste through valve 51 and line 50. Valve 51 is a quick opening valve actuated by cycle timer 53 and three-way air valve 52. Purified Dowtherm A vapor is taken overhead from purifier 48 through line 54 to air condenser 55. The condenser 55 is positioned a sufficient elevation h above the body 41' of Dowtherm A to provide the hydrostatic head required to return the condensate from condenser 55 via condensate leg 58 to the vaporizer. Condenser 55 is provided with a variable damper 56, which may be automatically controlled, to in turn regulate the degree of cooling. Air, water vapor, and other noncondensibles are periodically vented from the system by valve 57. It will be insufficient for the feed to the purifier to overcome the pressure drop through the level control valve and the pressure drop through the purifier vapor line back to the vaporizer. Elevation h can be made as large as necessary within practical limits to return condensate from the purifier to the vaporizer under virtually all conditions.

Figure 4:
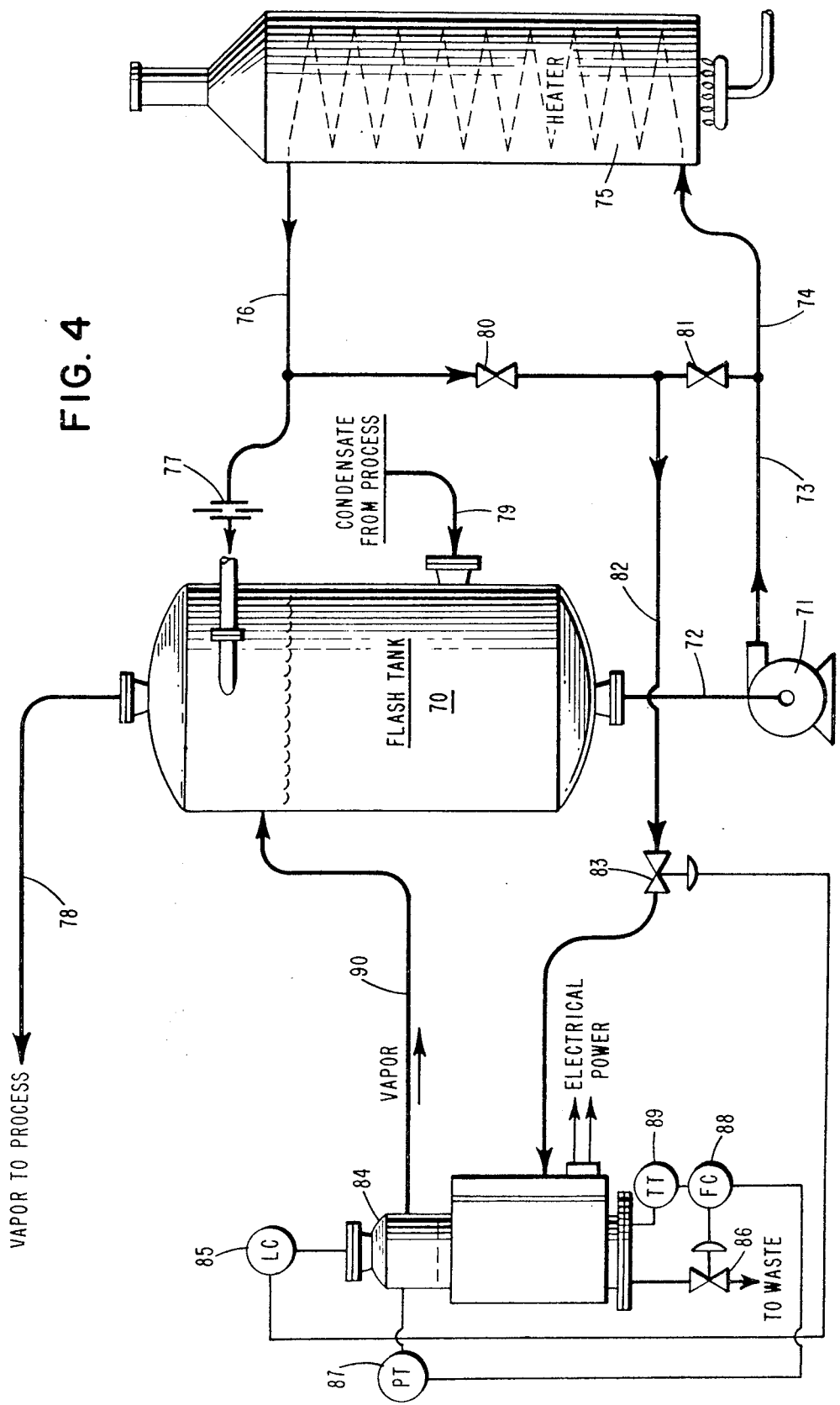
FIG. 4 is a diagrammatic view of a forced circulation vapor phase heat transfer system in combination with the purifier of the present invention.

Turning next to FIG. 4, there is illustrated a forced circulation vapor phase heat transfer system in combination with a purifier operating at substantially system pressure. The depicted flow scheme comprises two alternate embodiments: the first, with valve 80 closed and valve 81 open; a second with valve 80 open and valve 81 closed. Circulating pump 71 draws suction from flash tank 70 through line 72 and discharges through conduits 73 and 74 to fired heater 75. The heater charge is partially vaporized and the resulting vapor-liquid mixture is passed by way of conduit 76 and restriction orifice 77 to flash tank 70. Vapor to process use is taken off through line 78 and condensate returned from the process is admitted to the flash tank through conduit 79. With valve 80 closed and valve 81 open, the feed to purifier 84 is taken from the pump discharge or heater inlet. With valve 80 opened and valve 81 closed, the feed to the purifier is taken from the heater outlet; in the latter case, restriction orifice 77 provides the pressure drop necessary to establish fluid flow to the purifier and back to the vaporizer. In many cases, a restriction orifice will not be required because the pressure drop in the line entering the flash tank is usually quite high due to mixed phase flow conditions at the point where the line enters the flash tank. In view of the fact that there is usually a temperature rise of at least 10°-30° F. through heater 75, there is some advantage to feeding the purifier with the material from the heater outlet rather than with liquid from the pump discharge. This advantage is that the feed will contain more heat and will tend to flash to a greater extent, thus requiring a lesser amount of total heat from the electric resistance heating elements in the purifier. In either case, purifier feed passes by way of line 82 and valve 83 to purifier 84. Essentially pure heat transfer fluid vapor is returned without substantial condensation and without compression through line 90 to the vapor space in flash tank 70.

The control scheme illustrated in the FIG. 4 embodiment is somewhat more sophisticated than in the previous embodiment. A pressure transmitter 87 develops a signal responsive to pressure which is transmitted to a computing relay 88. A temperature transmitter 89 develops a signal responsive to the temperature of the boiling mixture in the bottom of purifier 84 which is likewise transmitted to computing relay 88. The temperature of the boiling mixture serves as an inferential measurement of composition. When the temperature rises to a preset value, the computing relay output signal to dump valve 86 acts to partly open the valve and drain the concentrated residue from the bottom of the purifier. Level controller 85 then modulates control valve 83 to admit feed material and maintain a constant level. The boiling temperature of the mixture is dependent also on the pressure in the purifier. The pressure transmitter signal acts in the computing relay to compensate for the pressure-temperature relationship, modifying the temperature setpoint and so removing residue material at essentially constant composition.

In the FIG. 4 embodiment the only heat losses encountered are those through thermal insulation and the sensible heat lost with the discharged residue.

Figure 5:
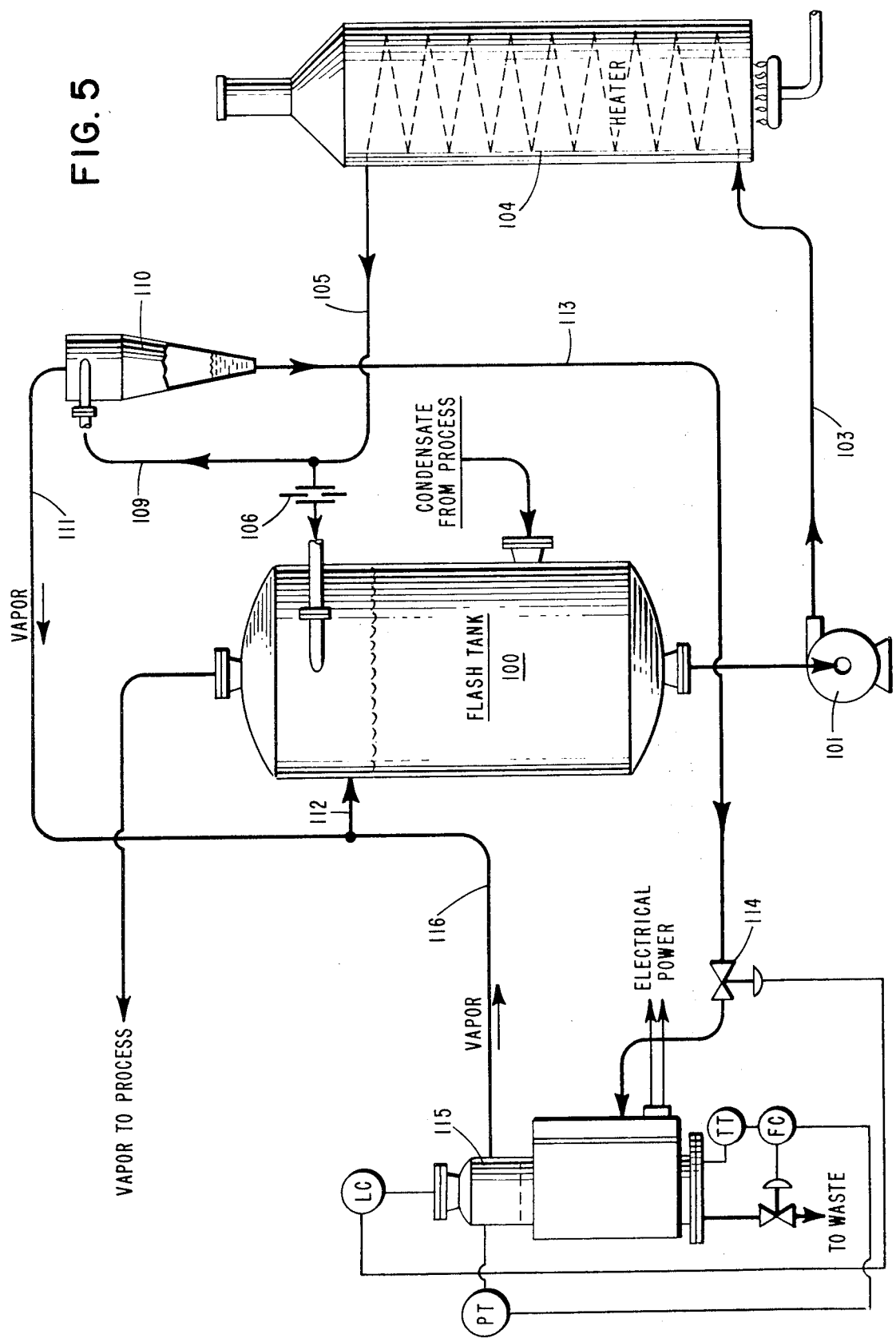
FIG. 5 is a diagrammatic view of a modified forced circulation vapor phase heat transfer system including an inertial or centrifugal separation which functions as a feed enricher to the purifier.

FIG. 5 illustrates a modified version of a forced circulation heat transfer system which includes a centrifugal separator in the feed path to the purifier. Circulating pump 101 takes suction from flash tank 100 and line 102 and discharges through conduit 103 to fired heater 104. In some cases the percentage of vapor at the discharge of the heater can be as high as 90 percent by volume. This vapor-liquid mixture is passed through line 105 and restriction orifice 106 to flash tank 100. A portion of the vapor-liquid mixture is taken off through line 109 to centrifugal separator 110, wherein the vapor-liquid mixture is separated into a vapor phase and a liquid phase, the relatively pure vapor going to the top of the separator and being returned to the flash tank through lines 111 and 112. The liquid in the bottom of separator 110, which is now enriched in residue constituents, is fed by way of line 113 and valve 114 to purifier 115. This scheme provides feed for the purifier which has been preconcentrated with regard to high boiling constituents, thus making the operation of any given purifier more effective. Purified heat transfer fluid vapor is returned in line 116 to flash tank 100. The controls and instrumentation for the purifier are identical to those of the FIG. 4 embodiment.

Although the foregoing description and the several embodiments of the invention have been directed to vapor phase heat transfer systems, the purifier of this invention can also be used with a liquid phase heating system. Liquid phase systems are frequently provided with an inert gas blanket over the liquid in a surge tank to prevent vaporization. In such a case, the temperature in the purifier must be high enough to develop sufficient vapor pressure to overcome the pressure of the inert gas blanket whereby vapor will be forced to flow from the purifier back to the surge tank.

Although the present invention has been described in conjunction with preferred embodiments, it is to be understood that modifications and variations may be resorted to without departing from the spirit and scope of the ivention, as those skilled in the art will readily understand. Such modifications and variations are considered to be within the purview and scope of the invention and the appended claims.

I claim:

1. Apparatus for the distillation purification of organic heat transfer fluid which comprises:
a closed vertically elongated vessel, a feed inlet conduit for said fluid connecting with said vessel at a locus intermediate the top and bottom thereof, a vapor outlet in the upper portion of the vessel, a bottoms discharge conduit connecting with the lower portion of the vessel, electric resistance heating means adapted to provide heat to a body of liquid in said vessel, an open-ended vertical draft tube disposed within the vessel and extending from near the bottom thereof to an elevation below said vapor outlet, means to control said fluid at a level above said draft tube, said draft tube defining a narrow annular space for fluid flow between the tube and the vertical sidewall of said vessel, said narrow annular space being in the range of from about 0.1 to about 1.5 inches.

2. The apparatus of claim 1 further characterized in that said draft tube has a height of from about 0.5 to about 1.2 pipe diameter based on the diameter of said shell.

3. The apparatus of claim 1 further characterized in that the width of said annular space is about 0.125 to about 0.375 inches.

4. The apparatus of claim 1 further characterized in that said resistance heating means comprises a plurality of longitudinally spaced band-like heater elements extending around the exterior surface of the lower portion of said vessel.

5. The apparatus of claim 1 further characterized in that said resistance heating means comprises a plurality of bayonet-hairpin type heater elements centrally clustered within said draft tube.

6. The apparatus of claim 5 further characterized in that said feed inlet conduit extends through said annular space to communicate with the interior of said draft tube.

7. The apparatus of claim 1 further characterized in that said means to control said liquid level comprises an automatic level control means to regulate the liquid level in said vessel.

8. The apparatus of claim 1 further characterized in the provision of a control valve in said bottoms discharge conduit and temperature control means responsive to the temperature of said body of liquid operatively connecting with said valve.

* * * * *